Patented Mar. 4, 1930

1,749,541

UNITED STATES PATENT OFFICE

ZACHEUS M. MARR, OF FREMONT, NEBRASKA

COMPOUND FOR FILLING RECESSES IN METAL CASTINGS AND THE LIKE

No Drawing.   Application filed April 16, 1928.   Serial No. 270,583.

This invention relates to a composition of matter for use as a filler for cracks, pin holes, blow holes and rough spots in castings and other metal articles, and for use in luting joints in pipes and the like.

The object of the invention is to provide a filler of comparatively high melting point, which will readily flow into the recesses to be filled, and which will have a desirable degree of hardness as shown by the Brinell test.

The filler is composed of sulphur, graphite and antimony the proportions of which may vary within wide limits. The mixture preferred consists of seven and one-half parts by volume of sulphur, one part of graphite and one part of antimony. The graphite and antimony are taken in powdered form.

The antimony serves to increase the hardness of the filler, and by varying the proportion thereof the hardness may be varied as desired. I have found that sulphur and graphite without the antimony yield a Brinell test of one hundred and twenty, while the addition of the antimony raises the melting point, and increases the Brinell test to one hundred and fifty.

It is to be understood that I do not confine my invention to any specific ratio of ingredients except where mentioned in the claims.

To prepare the filling composition I first melt the sulphur; and then while at a temperature of 550° to 600° centigrade I add the powdered graphite and antimony. It is to be understood, however, that the composition may be prepared at various temperatures.

The mixture in its molten condition is then cast into bars or other forms of desired size.

To apply the filler to a casting or the like I first heat the metal to a temperature above the melting point of the mixture, and I then rub a bar of the mixture over the heated metal, whereupon it melts and flows into any cracks, pin holes or other defects, filling them effectually.

In some instances I may melt the mixture and pour it into any fissures, recesses or holes it may be desired to fill.

Having fully described my invention, with an explanation of the preferred way by which it may be made and used,

What I claim is:—

1. A cast homogeneous mixture of seven and one-half parts by volume of sulphur, one part of graphite and one part of antimony.

2. A luting composition consisting of a homogeneous mixture of seven and one-half parts by volume of sulphur, one part of graphite and one part of antimony.

3. A luting composition consisting of such a mixture of sulphur, graphite and antimony as to produce a filler having a comparatively high melting point and degree of hardness and capable of use when melted as a filler for castings.

In testimony whereof I affix my signature.

ZACHEUS M. MARR.